Patented Sept. 28, 1926.

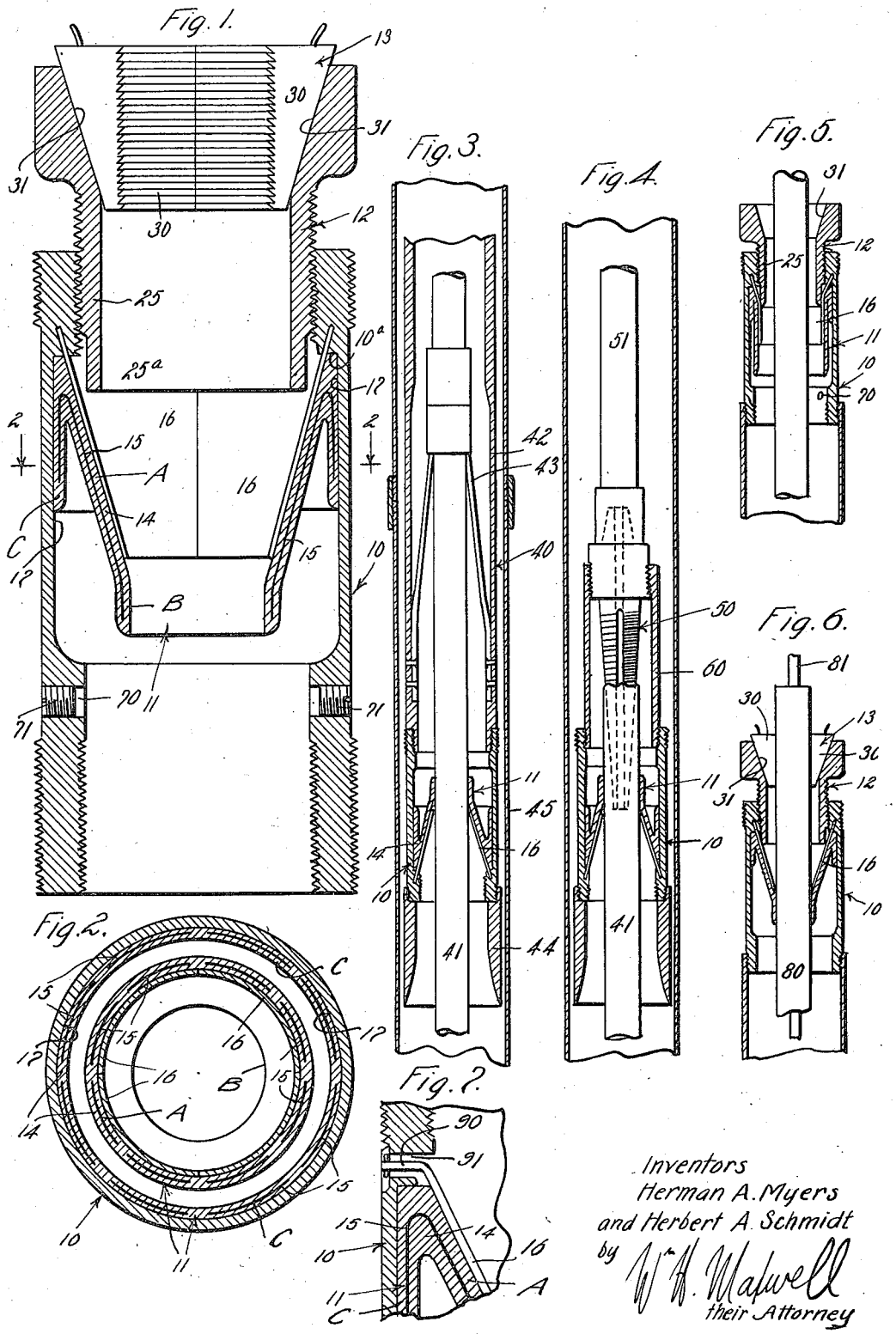

1,601,187

UNITED STATES PATENT OFFICE.

HERMAN A. MYERS, OF HUNTINGTON PARK, AND HERBERT A. SCHMIDT, OF BREA, CALIFORNIA.

PACKING TOOL.

Application filed December 17, 1923. Serial No. 681,178.

This invention has to do with a packing tool particularly useful in the drilling and handling of wells.

This invention has to with a tool of the general character set forth in our copending application entitled Packing tool, filed October 20, 1923, Serial No. 669,744. The tool provided by this invention is capable of and suitable for use in various ways and under various conditions. The tool is particularly useful in various operations of drilling and handling wells, for instance, oil wells, so, therefore, we will herein explain typical applications of it to oil wells, it being understood that such reference is merely to facilitate a clear understanding of the invention and is not to be understood as limiting or restricting its scope or range of application.

It is an object of this invention to provide a packing tool which will operate reliably and efficiently even under high pressure.

Another object of this invention is to provide a simple, effective and inexpensive construction for a tool of the character described.

The various objects and features of our present invention will be best and more fully understood from the following detailed description of a typical form of the invention, throughout which description reference is had to the accompanying drawings, in which:

Fig. 1 is a longitudinal detailed sectional view of a tool embodying our present invention;

Fig. 2 is a transverse sectional view of the tool shown in Fig. 1, being a view taken as indicated by the line 2—2 on Fig. 1;

Fig. 3 is a sectional view showing the tool provided by this invention in combination with a fishing tool, the tool provided by the invention being shown in operative position packing the fishing tool and section of drill pipe engaged by it;

Fig. 4 is a view similar to Fig. 3, showing the tool of the present invention in operative position in combination with another type of fishing tool;

Fig. 5 is a sectional view, showing the tool provided by this invention arranged at the upper end of a well casing so that it can be operated as a blowout preventer;

Fig. 6 is a view similar to Fig. 5, showing the tool provided by this invention holding and packing a tube which extends into the casing; and Fig. 7 is a view similar to a portion of Fig. 1, showing another form of construction.

The tool provided by this invention is a packing tool, and is applicable to numerous and various situations, being particularly suited for use to pack between two relatively working or moving loosely fitting parts or objects and being capable of packing and passing objects of various sizes and shapes. We will herein disclose a typical preferred form of our invention designed to handle and cooperate with round members, such as pipes, tubings, rods, etc., and of such design and proportions as to be applicable to several different sizes and uses without change or alteration. From the following description of our invention and of a few typical applications or uses of it, it will be apparent that it is capable of a wide range of application and that it may, in particular cases, be varied or changed from the details herein set forth to suit or conform to the circumstances under which it is to be used.

The form of our invention illustrated in the drawings includes, generally, a body 10, a flexible elastic packing 11, means 12 for operating the packing, and means 13 operable to grip or hold an object in the tool. The body 10 is an open ended tubular member preferably round in cross sectional configuration and preferably formed of a single piece of material. The particular shape, proportioning and construction of the body 10 depends, in any particular case, upon the conditions and circumstances under which the device is to be used, and is, therefore, subject to considerable variation. It is usually desirable to make the body 10 as compact and simple as possible consistent with strength and reliability. In the form of the invention illustrated in the drawings the body 10 is both externally and internally screw threaded at both ends so that it can have either end screw threaded into or onto another member or tool and can have other tools or members connected to both ends by internal or external screw threaded engagement. It will be apparent, of course, that, if the present tool is to be embodied or incorporated in another tool or device as a unitary part thereof, the body 10 may be integral with or a continuation of a suitable part of the other tool.

The packing 11 is a flexible elastic packing mounted in the body 10. The packing is tubular, and, in the form of the invention illustrated in the drawings, its main portion is tapered so that it is larger at one end than at the other. The packing 11 is connected by means of its larger end to the inside of the body 10 so that it is coaxial with the body and has its smaller end substantially removed longitudinally of the body from the point of connection with the body. The small end of the packing is entirely free of the body so that it can be expanded as hereinafter described. In practice the packing 11 is designed and proportioned, particularly with reference to its length and diameters, so that it will bear or grip closely around the smallest object to be passed through the tool and will expand to pass the largest object to be passed through the tool. When the tool is to be used in connection with an oil well or the apparatus employed in drilling an oil well, as we will hereinafter describe, it is desirable that the packing 11 be designed and proportioned so that it is suitable for handling or packing around a certain sized drill pipe or tubing and for passing, and, if necessary, packing around, the couplings, tool joints, and other parts that are usually employed in connection with the drill pipe.

In accordance with our invention the packing 11 includes, generally, a body 14 of rubber or other suitable material, a plurality of springs 15 in connection with the body of rubber, and a plurality of arms 16 that cooperate with the rubber. The body of rubber 14 is more or less V-shaped and includes a main tapered cylindrical part "A", a small substantially straight cylindrical part "B" extending from and forming a continuation of the smaller end of the main part "A", and a large substantially straight cylindrical part "C" extending from the large end of the main part "A" in the direction of the small end of the main part, or, in other words, in the same direction as the small cylindrical part. We will refer to the small cylindrical part of the rubber as the packing part, and to the large cylindrical part as the sealing part. The main part "A" of the rubber is arranged in the body 10 so that its large end engages a shoulder 10ª formed in the body 10. The packing part "B" of the body of rubber is integral with the main part "A" and operates to engage or pack around an object arranged through the tool. The sealing part "C" is preferably integral with the main part "A" and operates to engage the inner wall 17 of the body 10 to make a tight joint between the packing and body. The sealing part "C" is preferably proportioned so that it is somewhat compressed or contracted when in position in the body 10, and, therefore, bears outwardly against the inner wall of the body to make a tight joint with the body, and also hold the body of rubber in place in the body 10.

The springs 15, which, in practice, may vary widely in number and strength, are preferably embedded in the body of rubber. The springs are V-shaped leaf springs embodied or embedded in the body of rubber so that each has one leg extending into the main part "A" and the other into the sealing part "C". The springs 15 are preferably designed and proportioned so that they are somewhat compressed when the packing is in its normal unactuated condition, and, therefore, operate to exert an outward pressure on the sealing part "C" and thus aid it in bearing tightly against the body 10 and exert an inward pressure on the main part "A". The legs of the springs 15 may extend completely through the main part "A" and project into or through the packing part "B". When thus extended the springs 15 operate to more or less reenforce and aid the packing part "B" in its operation.

The arms 16 are located at the inner part of or within the main part "A" of the body of rubber and are operable to move or swing outwardly, as will be hereinafter described. The arms may be constructed and mounted in various ways in order to operate in the desired manner, it being preferred in most cases to construct them in the form of springs and to fix and rigidly connect them to the body 10 at the large end of the main part "A" of the body of rubber. In Figs. 1, 3, 4, 5, and 6, of the drawings we have illustrated the arms as carried in suitable sockets or openings provided in the body 10. In Fig. 7 of the drawings we show another manner of mounting the arms. In this form of construction the arms may be rigid; they are pivotally connected with the body 10 by means of tabs 90 which project from their inner ends and are loosely carried in openings 91 provided in the body. The arms are preferably shaped and proportioned so that their adjacent edges join or come together when the packing is in its normal position causing the arms to completely cover and protect the inner side of the main part of the body of rubber. The arms protect the main part of the rubber against injury by objects passing through the tool and also brace or reenforce it so that it is not forced out of shape by pressure applied to it.

The means 12 provided for operating the packing 11 is operable to expand the packing and hold it expanded. In its preferred form this means includes a ring 25 screw threaded into the body 10 so that it can be operated to engage the arms 16 to spread or move them outwardly and thereby cause spreading or expansion of the body of rubber. The ring 25 is preferably made large in diameter so that it does not interfere with passage of objects through the tool and so that it engages the arms comparatively close to where they connect with the body 10. In the form of the invention illustrated in the drawings the springs 15, in extending into the packing part "B" of the body of rubber, cause expansion of the packing part when the arms are operated to expand the main part. In the form of the invention illustrated in the drawings the ring 25 is carried by the screw threads provided at the end of the body 10, and is provided with an extension 25ª that projects inwardly longitudinally of the body to engage the arms 16.

The means 13 provided for gripping and holding an object arranged in the tool may include a plurality of wedge members or slips 30 adapted to be arranged in a suitable tapered seat 31. In the form of the invention illustrated in the drawings the seat 31 is provided in the ring 25, the ring being extended beyond the body 10 and enlarged somewhat for this purpose. The slips 30 are carried in the seat 31 so that they operate to grip an object in the manner usual to slips commonly employed in drilling wells. Although the seat 31 may be formed directly in the body 10 it is desirable, and, in most cases, preferable, to form it in the ring 25, or, at least, in a ring or part separate from the body so that this part of the tool can be entirely detached and removed if desired. By providing the seat 31 in the ring 25, which is operable to actuate the packing, the tool is made simple, the number of parts minimized, and the packing actuating means and object holding means are operable independently and are removable from the other parts of the tool.

From the foregoing description of the construction of the tool it is believed that its utility and possible applications will be readily apparent; however, we will herein describe a few typical applications or uses.

In Figs. 3 and 4 we have illustrated the tool in connection with a fishing tool such as is employed to remove drill pipe, and the like, from wells. In Fig. 3 we have illustrated the tool in connection with an overshot 40 so that it operates to pack between the overshot and the drill pipe 41 caught by the overshot. When used in this connection the ring 25 is removed. The overshot 40 is of the usual construction and includes a tubular body 42 carrying upwardly and inwardly extending spring members 43 which will pass downwardly over couplings and tool joints of the drill pipe but will engage under a coupling or tool joint of the drill pipe upon being moved upwardly on the drill pipe. When used in this connection the present tool is preferably attached to the lower end of the overshot with the packing extending upwardly, and may, if so desired, be provided at its lower end with a guide shoe 44, which guide shoe is ordinarily mounted on the lower end of the overshot. As the overshot is lowered downwardly through the well casing 45 the guide shoe directs the piece of drill pipe 41 through the tool provided by our invention and into the overshot. As the tool passes downwardly over the couplings or tool joints in connection with the drill pipe the packing 11 is expanded, by the couplings or joints engaging the arms 16, to allow their passage. When the overshot has caught the drill pipe 41, and, in fact, as soon as the drill pipe 41 has passed through the tool provided by our invention, the packing 11 engages the drill pipe and thus packs the overshot with the drill pipe so that fluid or pressure applied downwardly through the pipe carrying the overshot will be prevented from escaping from between the overshot and pipe caught by the overshot. The packing part "B," being comparatively small in diameter, engages or packs tightly around the pipe that passes through the tool and is further held tight on the pipe by the pressure fluid applied to the tool. The sealing part "C" makes a fluid-tight joint between the packing and body 10 as pressure applied to the tool urges or holds it out against the body and prevents leakage between the packing and body. The pressure applied downwardly through the pipe carrying the overshot is, in practice, often very great as it is desirable, in fact, sometimes necessary, to force circulation downwardly through the pipe caught by the overshot in order to dislodge it. With the construction provided by the present invention the pressure thus applied does not tend to leak past the tool but as it is increased tends to make the packing tighter. Pressure applied to the tool provided by our invention forces the part "B" of the packing inwardly against the object or part extending through the tool and forces the part "C" outwardly against the body 10, making both connections particularly tight and effective. It is to be noted that the tool provided by our invention, when employed in the manner just described, operates independently of the overshot and only packs around the drill pipe and does not aid, modify, or in any way influence the operation of the overshot in engaging and holding the drill pipe 21.

In Fig. 4 of the drawings the fishing tool, instead of being an overshot, is a tap 50, connected to the lower end of a suitable pipe 51 and adapted to screw thread into the broken-off pipe 41. The tool provided by our invention is connected with the tap, in the present case through a suitable coupling or extension 60, so that it extends over or receives the pipe 41 to pack the tap with the pipe 41 in much the same manner as we described above. This application of our invention will illustrate that it applicable to fishing tools of various kinds and types and that it may be connected with the fishing tools in various manners, for instance, directly, as is the case of the overshot, and indirectly, as in the case of the tap.

In Fig. 5 of the drawings we have shown the tool provided by our invention mounted on the upper end of a well casing where it will pass the drilling tools into and out of the well. When used in this manner the tool is arranged so that the packing 11 extends downwardly so that it is operable to prevent or check blowing out between the drill pipe and well casing. When used in this connection the ring 25 is preferably employed and is operated to normally hold the packing 11 expanded so that the drilling tools can normally be passed into and out of the casing without engaging or being interfered with by the packing. When there is an indication of blowing out between the casing and drilling tools the ring 25 can be very easily and quickly actuated or rotated to release the packing so that the packing engages the drilling tools and is in position to effectively check the blowing out. When used as a blowout preventer, or in a like situation, the body of the tool may be provided with openings 70 through which pressure may be relieved if so desired. The openings 70 may normally be closed by suitable plugs 71.

In Fig. 6 of the drawings we have illustrated the tool in use on the top of a well casing to pack around and hold a pump casing 80 through which a sucker rod 81 may operate. The ring 25 is preferably positioned so that the packing is released and operates to pack around the casing 80. In a situation of this kind the means 13 may be employed to hold or support the pump casing 80. The slips 30 are arranged in the seat 31 and operate to grip and hold the casing 80 in the manner usual to slip devices.

From the foregoing brief descriptions of typical applications of our present tool it will be apparent that it is useful in various manners and under various conditions in a well, at the top of a well, and in numerous other situations. The present tool is useful in various operations about a well, for instance, in connection with numerous fishing operations, during pumping, cleaning, cementing, etc.

Having described only a typical preferred form of our invention we do not wish to limit ourselves to the specific details hereinabove set forth but wish to reserve to ourselves any changes or variations that may appear to those skilled in the art or fall within the scope of the following claims.

Having described our invention, we claim:

1. A tool of the character described including, a body, a tapered tubular packing carried in the body, and means tightly connecting the body and packing including a sealing part extending from the large end of the packing and arranged so that it bears tightly out against the body by virtue of its shape.

2. A tool of the character described including, a body, a tapered tubular packing carried by the body, and a sealing part projecting from the packing and positioned to be forced outwardly against the body by pressure applied to the tool and normally bearing outwardly against the body by virtue of its shape.

3. A tool of the character described including, a body, packing means carried by the body and including, a tapered tubular part, a sealing part extending from the tubular part and adapted to engage the body, and a spring in connection with said parts urging the sealing part against the body.

4. A tool of the character described including, a body, packing means carried by the body and including a tapered tubular part and sealing part extending from the tubular part and adapted to engage the body, and spring means in connection with the sealing part urging it into engagement with the body.

5. A tool of the character described including, a body, a tapered tubular packing carried by the body, and a sealing part extending from the packing and engaging the body, the sealing part being of a different size than the part it engages so that it engages said part with pressure.

6. A tool of the character described including, a body, a tapered tubular packing carried in the body, a sealing part extending from the packing and engaging the body, and a plurality of springs in connection with the packing and sealing part each spring having a part in connection with the packing and a part in connection with the sealing part.

7. A tool of the character described including, a body, a tapered tubular packing carried in the body, a sealing part extending from the packing and engaging the body, and a plurality of springs in connection with the packing and sealing part each spring having a part embedded in the packing and a part embedded in the sealing part.

8. A tool of the character described including, a body, a tapered tubular packing carried by the body, a sealing part extending from the packing and engaging the body, and a plurality of springs, each spring being V-shaped and having one side embedded in the packing and the other side embedded in the sealing part.

9. A tool of the character described including, a body, packing means carried in the body including a tapered tubular part and a substantially straight tubular part extending from the small end of the tapered part, a plurality of springs extending between and connected with the two parts of the packing, and a plurality of arms at the inner side of the tapered part of the packing.

10. A tool of the character described including, a body, packing means carried by the body including a tapered tubular part, a substantially straight tubular part extending from the small end of the tapered part, a plurality of springs extending from the tapered part into the substantially straight part, and a plurality of outwardly movable arms at the inner side of the tapered part.

11. A tool of the character described including, a body, packing means carried by the body including a tapered tubular part, a substantially straight tubular part extending from the small end of the tapered part, and a substantially straight tubular part extending from the large end of the tapered part and engaging the body, a plurality of springs in connection with the packing each spring being V-shaped and having a part in connection with the tubular part extending from the large end of the tapered part and having a part in connection with the tapered part and extending into the substantially straight part that extends from the small end of the tapered part, and a plurality of outwardly movable arms at the inner side of the tapered part.

12. A tool of the character described including, a body, a tapered tubular expansible packing carried by the body to normally operatively engage an object arranged in the body, and means carried by the body operable to expand the packing so that it does not engage an object arranged in the body.

13. A tool of the character described including, a body, a tapered tubular expansible packing carried by the body, and means carried by the body operable to expand the packing and releasably hold it expanded.

14. A tool of the character described including, a body, a tapered tubular expansible packing carried by the body, and a screw member operable to expand the packing.

15. A tool of the character described including, a body, a tapered tubular expansible packing carried by the body, and a member screw threaded to the body and operable to engage and expand the packing.

16. A tool of the character described including, a body, a tapered tubular expansible packing carried by the body, and a ring screw threaded to the body and operable to engage and expand the packing, the inside diameter of the ring being greater than the normal smallest diameter of the packing.

17. A tool of the character described including, a body, a tapered tubular expansible packing carried by the body, a plurality of outwardly movable arms within the packing, and means operable to move the arms outwardly.

18. A tool of the character described including, a body, a tapered tubular expansible packing carried by the body, a plurality of outwardly movable arms in connection with the packing, and a member carried by the body to be operable to move the arms outwardly to cause expansion of the packing.

19. A tool of the character described including, a body, a tapered tubular expansible packing carried by the body, a plurality of outwardly movable arms engaging the inner side of the packing, the adjacent edges of the arms abutting when the packing is in its normal position, and a member carried by the body to be operable to move the arms outwardly.

20. A tool of the character described including, a body, a tapered expansible packing carried by the body, a member connected with the body to be detachable therefrom and operable to expand the packing.

21. A tool of the character described including, a body, a tapered tubular expansible packing carried by the body adapted to pack around an object arranged through the body, and slip means detachably connected with the body and adapted to support an object in the body, the slip means including a ring screw threaded to the body and slips carried by the ring.

22. A tool of the character described including, a body, a tapered tubular expansible packing carried by the body, a ring screw threaded to the body so that it is operable to engage and expand the packing, and means carried by the ring to support an object in the body.

23. A tool of the character described including, a body, a tapered tubular expansible packing carried in the body and adapted to pack around an object arranged through the body, a ring having a screw threaded connection with the body so that it is operable to engage and expand the packing, a tapered seat in the ring, and slips adapted to be carried in the seat to hold an object arranged in the body.

In witness that we claim the foregoing we have hereunto subscribed our names this 4th day of December, 1923.

HERBERT A. SCHMIDT.
HERMAN A. MYERS.